United States Patent
Hoag et al.

(10) Patent No.: US 11,639,682 B2
(45) Date of Patent: May 2, 2023

(54) METHOD OF PROVIDING PASSIVE PRE-CHAMBER IGNITION WITH VARYING NOZZLE SIZES FOR INTERNAL COMBUSTION ENGINE

(71) Applicant: Southwest Research Institute, San Antonio, TX (US)

(72) Inventors: Kevin L. Hoag, San Antonio, TX (US); Matthew M. Hoffmeyer, San Antonio, TX (US); Bansal Shah, San Antonio, TX (US); Zainal Abidin, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/592,746

(22) Filed: Feb. 4, 2022

(65) Prior Publication Data

US 2022/0170410 A1    Jun. 2, 2022

Related U.S. Application Data

(62) Division of application No. 16/866,256, filed on May 4, 2020, now abandoned.

(51) Int. Cl.
*F02B 19/12* (2006.01)
*F02B 19/18* (2006.01)

(52) U.S. Cl.
CPC .............. *F02B 19/12* (2013.01); *F02B 19/18* (2013.01)

(58) Field of Classification Search
CPC .. F02B 19/1019; F02B 19/1014; F02B 19/12; F02B 19/18; F02B 1/00; H01T 13/54; B23P 15/00; B64C 2201/044
See application file for complete search history.

(56) References Cited

U.S. PATENT DOCUMENTS

| | | | |
|---|---|---|---|
| 8,127,741 B2* | 3/2012 | Johng | H01T 13/54 123/169 EA |
| 2013/0055986 A1 | 3/2013 | Tozzi | |
| 2014/0165980 A1 | 6/2014 | Cheira | |

(Continued)

FOREIGN PATENT DOCUMENTS

| | | |
|---|---|---|
| DE | 10 2014 004943 A1 | 2/2015 |
| DE | 10 2017 009228 | 4/2019 |

(Continued)

OTHER PUBLICATIONS

Written Opinion of the International Searching Authority PCT/US2021/030372.

*Primary Examiner* — Xiao En Mo
(74) *Attorney, Agent, or Firm* — Livingston Law Firm

(57) ABSTRACT

A method of providing a passive ignition pre-chamber for an internal combustion engine. The pre-chamber is typically implemented as a cap on the electrode end of a spark plug and encloses a pre-chamber volume in which fuel is mixed with air to form a consistently ignitable mixture. The pre-chamber is passive in the sense that gas exchange with the engine's main combustion chamber is realized by local flow fields near nozzles into the main chamber and by pressure differences between the pre-chamber and the main chamber. The nozzles are sized such that at least one of the nozzles has a larger diameter than the remaining nozzles, as optimized using flow field and pre-chamber turbulence analysis.

7 Claims, 5 Drawing Sheets

(56) References Cited

U.S. PATENT DOCUMENTS

| | | | |
|---|---|---|---|
| 2014/0261296 A1* | 9/2014 | Sotiropoulou | F02B 19/18 |
| | | | 123/260 |
| 2016/0053670 A1* | 2/2016 | Tozzi | F02P 13/00 |
| | | | 123/260 |
| 2016/0230645 A1* | 8/2016 | Schock | F02B 19/1052 |
| 2018/0266307 A1* | 9/2018 | Muto | F02B 19/08 |
| 2018/0363539 A1* | 12/2018 | Shelby | F02B 19/12 |

FOREIGN PATENT DOCUMENTS

| | | |
|---|---|---|
| EP | 3 180 504 A1 | 6/2017 |
| JP | 2018 131911 | 8/2018 |
| WO | WO 2012/091739 | 7/2012 |

* cited by examiner

METHOD OF PROVIDING PASSIVE PRE-CHAMBER IGNITION WITH VARYING NOZZLE SIZES FOR INTERNAL COMBUSTION ENGINE

RELATED CASE

This case is a divisional of U.S. application Ser. No. 16/866,256, filed May 4, 2020, and entitled "Passive Pre-Chamber Ignition with Varying Nozzle Sizes For Internal Combustion Engine".

TECHNICAL FIELD OF THE INVENTION

This invention relates to internal combustion engines, and more particularly to using passive pre-chamber ignition with such engines.

BACKGROUND OF THE INVENTION

The pre-chamber ignition concept is used with spark-ignition engines to enable lean or diluted engine operation while having a suitable combustion process. The basic function of a pre-chamber is to provide a small space where fuel can be combined with air to form a mixture consistently ignitable by a spark plug. When ignited, this mixture provides the required energy to combust a lean or dilute mixture within the cylinder's main combustion chamber at the optimum time for efficiency and/or pollution control.

Various types of pre-chamber configurations exist, which can be classified into active and passive configurations. An active pre-chamber system is equipped with additional fuel and/or air injection inside the pre-chamber. A passive pre-chamber realizes its gas exchange by local flow fields near orifices into the main chamber and by pressure differences between the pre-chamber and main-chamber.

A passive pre-chamber spark plug is composed of an ordinary spark plug with electrodes, on which a cap with orifices is put. The encapsulated volume is the pre-chamber and is connected to the main combustion chamber by the orifices.

In addition to lean-burn natural gas engines, passive pre-chambers are attractive to improve the robustness of combustion in dilute mixture (high EGR) gasoline engines, as well as for increased burning rate in stoichiometric and rich gasoline engines.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to passive pre-chambers for spark-ignited engines. The pre-chamber's nozzles (orifices) are varied in size, rather than being all the same size. This improves scavenging while maintaining the original objectives of pre-chamber ignition.

Figure 1:
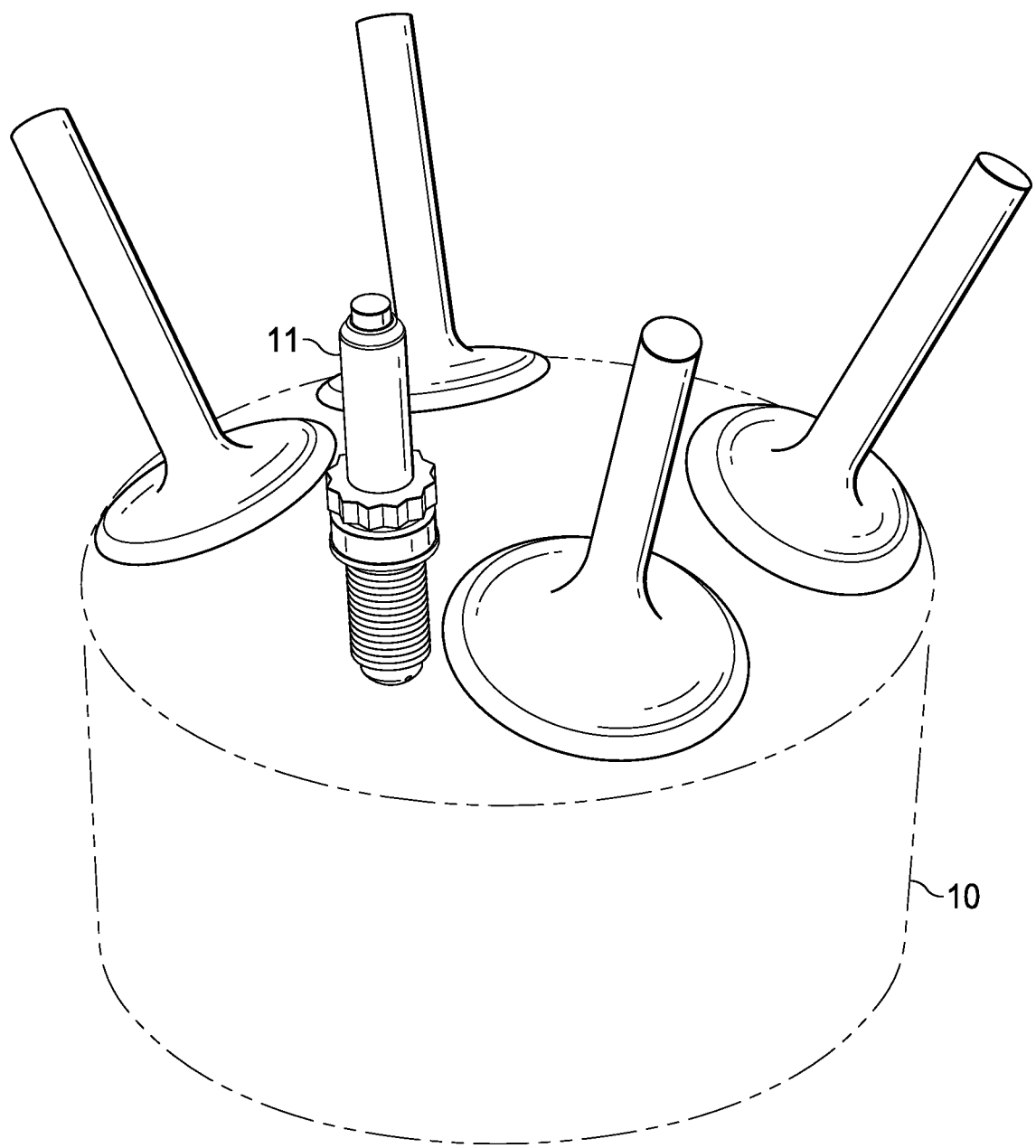
FIG. 1 illustrates an engine cylinder equipped with a pre-chamber spark plug.
Figure 2:
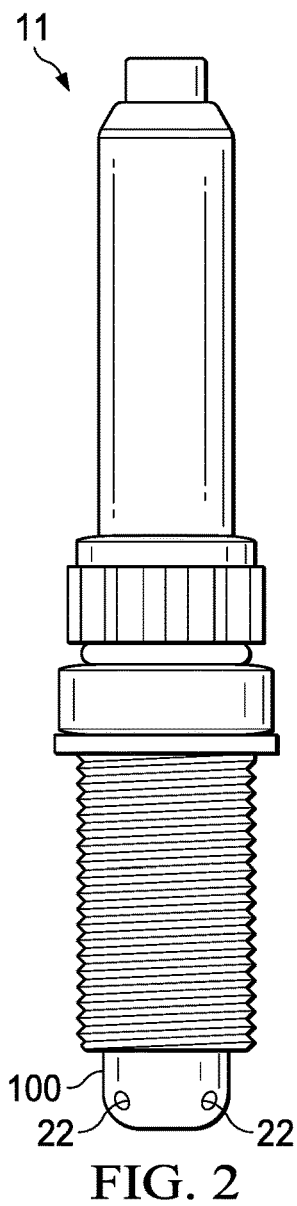
FIG. 2 illustrates a pre-chamber spark plug.
Figure 3:
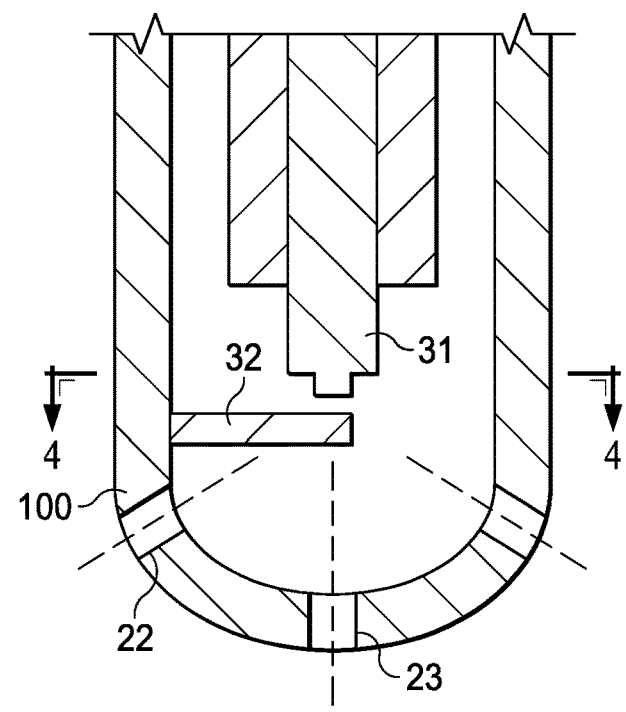
FIG. 3 is a cross-sectional view of the pre-chamber of the spark plug of FIG. 2.

FIGS. 1-3 illustrate the general concept of pre-chamber ignition. In the example of FIGS. 1-3, the pre-chamber 100 is implemented as a cap at the end of a spark plug 11. However, as explained below, a pre-chamber may be any housing that encapsulates a small volume between the spark plug electrodes and the main chamber, with orifices for fluid flow.

FIG. 1 illustrates an engine cylinder 10 equipped with a pre-chamber spark plug 11. FIG. 2 illustrates spark plug 11, and FIG. 3 is a cross-sectional view of the pre-chamber portion of spark plug 11.

The pre-chamber 100 is a bowl-shaped housing that surrounds the electrode end of sparkplug 11. The pre-chamber 100 is installed such that it communicates with the main chamber 10 of the combustion cylinder via orifices (herein referred to as "nozzles") 22 and 23. The pre-chamber housing is made from a metal or other material that will withstand engine conditions, and is permanently attached to the end of spark plug 11 to form a sealed pre-chamber compartment.

During the engine's intake stroke, the pre-chamber nozzles 22 and 23 scavenge the residual in the main chamber 10 with fresh mixture from the intake flow. During compression, fresh mixture from the larger main chamber volume is forced through the nozzles 22 and 23 into the pre-chamber. When the sparkplug 11 ignites this mixture, burning jets expand through each nozzle 22 and 23, back into the main chamber. The result is multiple ignition points in the main chamber, providing a faster and more robust combustion event.

A feature of the invention is the recognition of engine conditions at which it is difficult to maintain reasonable performance of the passive pre-chamber concept. Under high load conditions, passive pre-chambers have been found to work very well. The mixture in the pre-chamber is easily ignited, and a burning jet exiting each nozzle provides multiple ignition sources in the main combustion chamber. The 10-90 burn duration (time or crank angle increment during which the tenth percentile to the ninetieth percentile of fuel is burned) is reduced to nearly half the duration seen under the same conditions in an open chamber engine.

However, at light loads and high dilution ratios, it is difficult to achieve ignition, much less complete combustion. The difficulty is explained by the inability to sufficiently evacuate the pre-chamber of the burned mixture from the previous cycle and low turbulence. A high percentage of the mass in the pre-chamber at the time of the spark event is burned exhaust gas. This dilutes the fresh mixture to the point that it will not ignite, or if it ignites the flame front is not sustained. Low turbulence slows down the flame propagation within the pre-chamber.

Figure 4:
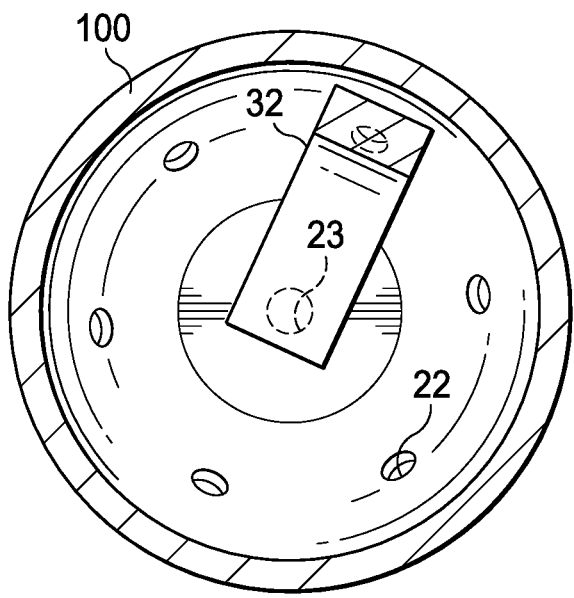
FIG. 4 is an inside view of a conventional pre-chamber.

FIG. 4 is a bottom view of a conventional pre-chamber 100, having seven equally sized nozzles in its bottom wall. That is, all nozzles have the same size diameter. In this embodiment, the pre-chamber 100 has a round bowl-shaped bottom wall, such as the end cap of a spark plug as described above. However, other configurations are possible. For example, the "cap" could be cylindrical with nozzles on both a bottom wall and side walls.

The view of FIG. 4 is from the sparkplug 11, looking into the pre-chamber 100 toward the main chamber 10. The side electrode 32 of the sparkplug 11 is shown. In the example of FIG. 4, and in the embodiments of this description, the "J electrode" 32 extends under the center electrode 31, but other electrode configurations are possible.

Referring to both FIGS. 3 and 4, a "center" nozzle 23 is the nozzle in the bottom wall directly under the spark plug's center electrode 31. "Side" nozzles 22 are placed around the sides of the pre-chamber, here around the circumference of the bottom wall of the pre-chamber 100.

Figure 5:
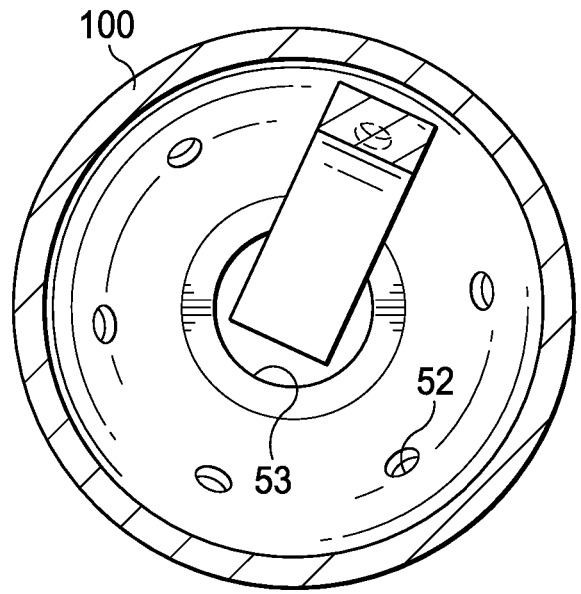
FIG. 5 is an inside view of a pre-chamber having an enlarged center nozzle.
Figure 6:
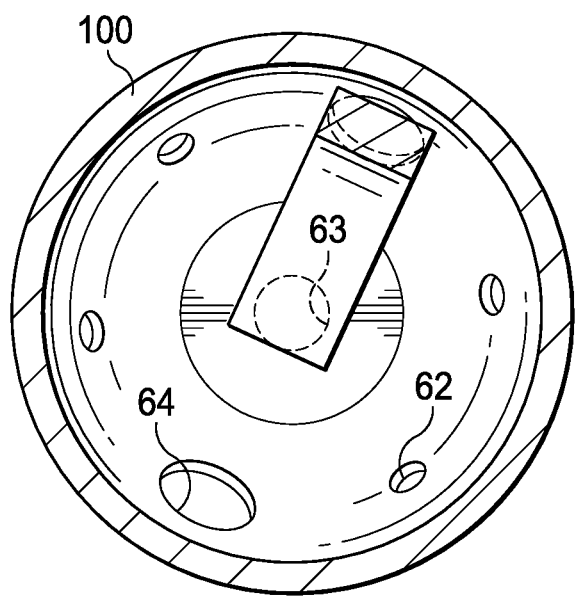
FIGS. 6 and 7 are inside views of a pre-chamber having enlarged side and center nozzles.
Figure 7:
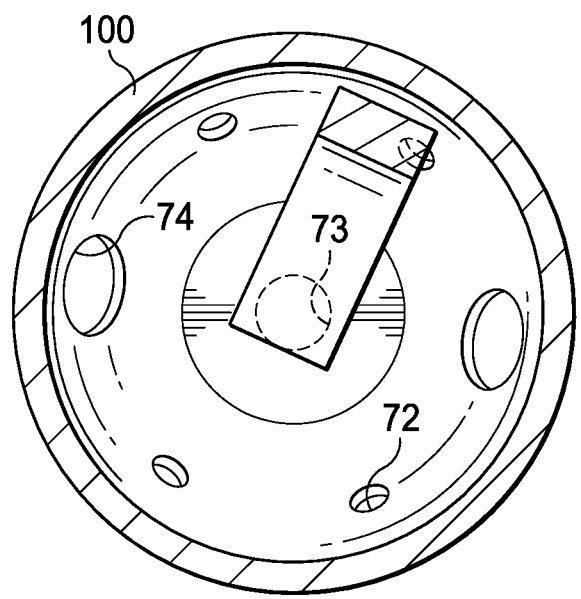

FIGS. 5-7 illustrate various embodiments of a pre-chamber 100 in accordance with the invention. Only the bottom wall of the pre-chamber is shown. Although pre-chamber 100 is of the type described above, suitable as a cap for a spark plug, other configurations are possible. Pre-chamber 100 may be any housing that provides an enclosure between the electrode end of the spark plug and the top of the combustion chamber, and has a bottom wall that separates the pre-chamber from the main combustion chamber. The significance of the invention is the configuration of nozzles 22 and 23 within the pre-chamber end wall.

Based on bulk flow field and pre-chamber turbulence analyses, one or more of the nozzles between the pre-chamber and main chamber is made larger. This facilitates removal of residual from the pre-chamber while still creating a flame jet at each nozzle.

In the embodiment of FIG. 5, the center nozzle 53 is enlarged relative to the side nozzles 52. The side nozzles 52 are smaller, and here are all of the same diameter.

In the embodiments of FIGS. 6 and 7, the center nozzles 63 and 73 are enlarged relative to a portion of the side nozzles 62 and 72. However, another portion of the side nozzles, here two, are enlarged relative to the other side nozzles. These two enlarged side nozzles 64 and 74 are spaced 180 degrees apart from each other.

In the embodiment of FIG. 6, the enlarged side nozzles 64 are crossways from the bulk tumble flow field within pre-chamber 100. In the embodiment of FIG. 7, the enlarged side nozzles 74 are aligned with the bulk tumble flow field within pre-chamber 100. In general, the "bulk tumble flow field" is a flow field that runs orthogonal to the side electrode 32 when the spark plug is activated.

Each of the configurations shown in FIGS. 5-7 are examples of the general notion that by using more than one nozzle diameter, and hence more than one nozzle flow area, pre-chamber evacuation and turbulence can be optimized to the needs of a particular engine. Various combinations of an enlarged center nozzle and one or more enlarged side nozzles may be implemented.

Figure 8:
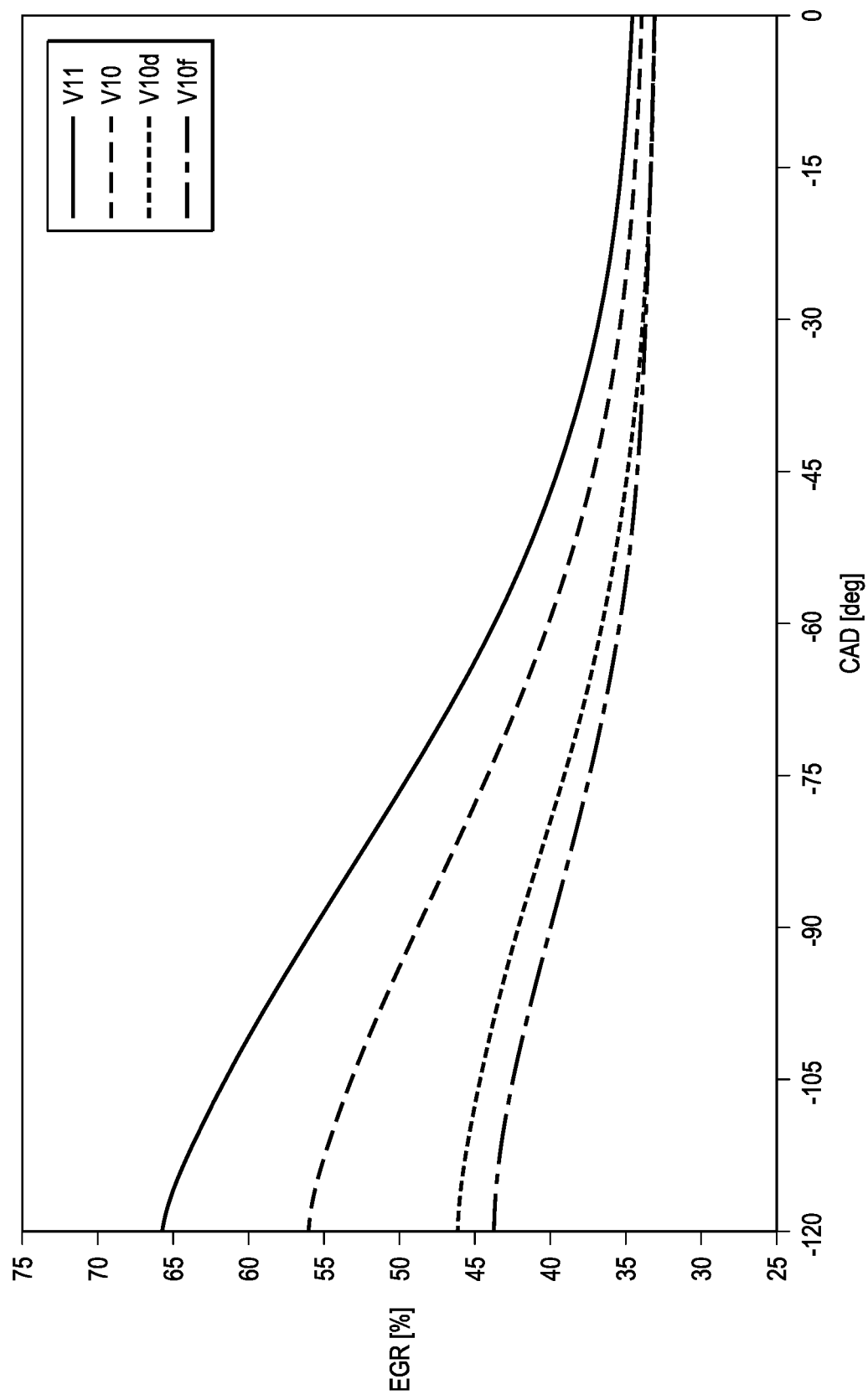
FIG. 8 illustrates how various nozzle configurations may be evaluated using computational fluid dynamics modeling.

FIG. 8 illustrates how various nozzle configurations may be evaluated using computational fluid dynamics modeling. A pre-chamber with a nozzle configuration of interest is modeled at a desired engine operating point. Here the engine operating points is a light-load (two bar BMEP) operating point with 22 percent exhaust gas recirculation (EGR).

The residual percentage in the pre-chamber is plotted during the late portion of the compression stroke. The dropping residual percentage is an indication of the burned gas being evacuated from the pre-chamber and replaced with fresh air-fuel mixture. For the case shown, complete evacuation would take the EGR percentage to 31% which is equal to the total (external+internal) EGR percentage inside the main chamber.

The top two plots are of two different pre-chambers having seven nozzles of the same diameter. The bottom two plots are of two pre-chambers with differently sized nozzles, such as those of FIGS. 5-7. Pre-chamber spark timing is typically in the range of 55 to 35 degrees before TDC, making the reduced residual content at that Crank Angle Degree (CAD) range especially important.

For the configurations of FIGS. 5-7, it was also important to assure that the varying nozzle diameters did not adversely impact full load performance. Full-load conditions were evaluated, and it was confirmed that the desired performance was achieved.

What is claimed is:

1. A method of manufacturing an ignition pre-chamber for an internal combustion engine, the engine having cylinders each with a spark plug with an electrode end and a combustion chamber, and the internal combustion engine being equipped for exhaust gas recirculation (EGR), comprising:
    modeling a pre-chamber having a housing that encloses a volume between the electrode end of the spark plug and the combustion chamber, a bottom wall of the pre-chamber housing having a number of nozzles that provide flow between the pre-chamber housing and the combustion chamber;
    using computational fluid dynamics modeling to evaluate the pre-chamber with nozzles having varying nozzle diameters;
    wherein the computational fluid dynamics modeling is performed by mapping the EGR residual percentage of the pre-chamber during a compression stroke of the engine as a function of crank angles of the engine, repeating the mapping step for a number of candidate nozzle configurations, and selecting a candidate configuration on the basis of total EGR residual percentage at 55 to 35 crank angle degrees before top dead center, wherein the total EGR residual percentage is equal to an external EGR residual percentage plus an internal EGR residual percentage; and
    selecting nozzle diameters based on the step of using computational fluid dynamics modeling.

2. The method of claim 1, wherein the pre-chamber housing is modeled as a cap at the electrode end of the spark plug.

3. The method of claim 1, wherein the spark plug has a center electrode and wherein a nozzle under the center electrode end has a larger diameter than the remaining nozzles.

4. The method of claim 1, wherein the spark plug generates a tumble flow field when activated, and wherein one or more nozzles aligned with the tumble flow field have a larger diameter than the remaining nozzles.

5. The method of claim 1, wherein the spark plug generates a tumble flow field when activated, and wherein one or more nozzles crossways with the tumble flow field having a larger diameter than the remaining nozzles.

6. The method of claim 1, wherein the spark plug has a J-type electrode that extends under the center electrode.

7. The method of claim 1, wherein the modeling step is performed at a light engine load.

* * * * *